United States Patent [19]
Yagi et al.

[11] Patent Number: 5,490,132
[45] Date of Patent: Feb. 6, 1996

[54] APPARATUS INCLUDING AT LEAST ONE PROBE FOR BEING DISPLACED RELATIVE TO A RECORDING MEDIUM FOR RECORDING AND/OR REPRODUCING INFORMATION

[75] Inventors: Takayuki Yagi, Machida; Toshiyuki Komatsu, Hiratsuka; Katsunori Hatanaka, Yokohama; Toshihiko Miyazaki, Hiratsuka, all of Japan

[73] Assignee: Canon Kabushiki Kaisha, Tokyo, Japan

[21] Appl. No.: 7,000

[22] Filed: Jan. 21, 1993

Related U.S. Application Data

[63] Continuation of Ser. No. 685,047, Apr. 15, 1991, abandoned.

[30] Foreign Application Priority Data

Apr. 18, 1990 [JP] Japan .................. 2-104060

[51] Int. Cl.[6] .................................................. G11B 9/00
[52] U.S. Cl. .................. 369/126; 369/101; 250/306
[58] Field of Search .................... 365/151, 174; 369/126, 101, 276, 100; 250/306, 307

[56] References Cited

U.S. PATENT DOCUMENTS

| | | | |
|---|---|---|---|
| 3,227,457 | 1/1966 | Tada | 360/83 |
| 3,789,420 | 1/1974 | Claytor et al. | 346/1 |
| 4,510,531 | 4/1985 | Sugiyama | 369/126 X |
| 4,567,530 | 1/1986 | Lewiner et al. | 358/295 |
| 4,831,614 | 5/1989 | Duerig et al. | 369/111 X |
| 4,889,988 | 12/1989 | Elings et al. | 250/306 |
| 4,916,688 | 4/1990 | Foster et al. | 369/126 |
| 5,015,850 | 5/1991 | Zdeblick et al. | 369/101 X |
| 5,043,577 | 8/1991 | Pohl et al. | 250/306 |
| 5,047,633 | 9/1991 | Finlan et al. | 250/306 |
| 5,132,934 | 7/1992 | Quate et al. | 365/151 |
| 5,166,520 | 11/1992 | Prater et al. | 250/306 |
| 5,184,344 | 2/1993 | Takeuchi et al. | 369/126 |
| 5,187,369 | 2/1993 | Miyazaki et al. | 369/126 |
| 5,199,021 | 3/1993 | Hatanaka et al. | 369/126 |
| 5,220,555 | 6/1993 | Yanagisawa et al. | 369/126 |
| 5,251,200 | 10/1993 | Hatanaka et al. | 369/126 |
| 5,260,926 | 11/1993 | Kuroda et al. | 369/126 |
| 5,276,672 | 1/1994 | Miyazaki et al. | 369/126 |
| 5,390,161 | 2/1995 | Kurihara et al. | 369/126 |
| 5,394,388 | 2/1995 | Hatanaka et al. | 369/126 |
| 5,412,641 | 5/1995 | Shinjo et al. | 369/126 |

FOREIGN PATENT DOCUMENTS

| | | |
|---|---|---|
| 0247219 | 12/1987 | European Pat. Off. . |
| 0272935 | 6/1988 | European Pat. Off. ............... 365/151 |
| 0325056 | 7/1989 | European Pat. Off. . |
| 2525376 | 10/1983 | France . |
| WO8907256 | 8/1989 | WIPO . |

OTHER PUBLICATIONS

King, et al., "Photographic Techniques for Information Storage," Proceedings of the Institue of Radio Engineers, Inc., vol. 41, 1953, pp. 1421 through 1428.

Heinzelmann, et al., "Topography and Local Modification of the HoBa$_2$Cu$_3$–O$_{7-x}$ (001) Surface Using Scanning Tunneling Microscopy," Appl. Phys. Lett. 53 (24), Dec. 1988, pp. 2447 through 2449.

Primary Examiner—Georgia Y. Epps
Assistant Examiner—Kim-Kwok Chu
Attorney, Agent, or Firm—Fitzpatrick, Cella, Harper & Scinto

[57] ABSTRACT

An apparatus for inputting and/or outputting information includes a plurality of probes arranged at positions respectively facing each of the plural blocks which carry information, a device for enabling the plurality of probes to respectively perform tracking independently, and a device for inputting information to and/or outputting information from the information carrier by the use of the aforesaid probes.

24 Claims, 10 Drawing Sheets

APPARATUS INCLUDING AT LEAST ONE PROBE FOR BEING DISPLACED RELATIVE TO A RECORDING MEDIUM FOR RECORDING AND/OR REPRODUCING INFORMATION

This application is a continuation of prior application, Ser. No. 07/685,047 filed Apr. 15, 1991, now abandoned.

BACKGROUND OF THE INVENTION

1. Field of the Invention

The present invention relates to an apparatus for recording and/or reproducing information.

2. Related Background Art

Information which requires recording, such as computation information, image information, etc., is on the increase at present, and a recorder with a larger capacity has increasingly been in a great demand.

Further, with the evolution of the semiconductor process technique, the miniaturization of a recorder unit is anticipated because the microprocessor has been more miniaturized with a higher computational capability. In order to satisfy such requirements, researches and experiments have been carried on with the conventional techniques using various methods, such as magnetic recording, semiconductor memory, optical disc, etc., to implement the miniaturization of the recording area (minimum recording area) for one bit, which is the minimum recording unit in these methods.

For the magnetic recording, however, at least an area of several tens of μm is required as its minimum recording area for the magnetic recording head to cause changes in the magnetic flux on a magnetic recording medium. Because of this, the distance between the recording head and the recording medium is restricted, making it difficult to control the distance at less than approximately several hundred to several thousand angstroms. In the optical disc, it is also difficult to reduce the beam diameter to a dimension which is less than the optical wavelength to be applied; thus requiring several $\mu m^2$ as its minimum recording area.

As a means to make the minimum recording area extremely small, there has been proposed a recording and reproducing apparatus capable of providing a minimum recording area of 10 $nm^2$, in which a fine probe, chip, etc. (hereinafter collectively referred to as a probe) for generating the tunnel current for a recording medium is arranged to write recording information by changing the work functions of the recording medium surface with the tunnel current thus generated by the probe, which passes through the recording medium, and to read information by detecting the changes in the tunnel current between the probe and medium caused by the changes in the work function as the result of writing a record on the recording medium surface. For an apparatus such as this, there are some in which a plurality of the aforesaid probes for recording and reproducing are provided for the purpose of widening the recording area. The implementation of this recording and reproducing in a wide area is attempted by transporting a recording medium against the plurality of the probes to allow the entire probes to scan the recording medium surface at one time and perform the recording or reproducing by the tunnel current at that juncture.

However, in an apparatus for recording and reproducing such as this, the recording medium is transported at the time of scanning for recording or reproducing by each of the probes, and the respective probes are fixedly positioned with each other, or movably positioned only in the direction perpendicular to the medium, which each of them face, to adjust the space between the probe and medium. Therefore, in a case when each of the probes is caused to scan for recording along the specified path on the recording medium surface or to scan for reproducing the recorded information at each location sequentially, it is impossible to control each scanning by the respective probes. Consequently, there is a possibility that a recording or reproducing error occurs for a probe or probes because one or plural ones of the entire probes cannot scan along the specified path and information sequence even if the entire scanning is precisely controlled. Particularly, in a recording and reproducing apparatus using the tunnel current, there is a possibility that the recording and reproducing become impossible because its minimum recording area is so narrow that even if the thermal expansion of the recording medium and changes with the time elapsed are small, the resultant changes in the recording position produce a great affect, and if any one of the probes is adjusted to scan along the specified path and information sequence, the other probes are caused to be positioned apart entirely from the specified path and information sequence.

SUMMARY OF THE INVENTION

For a recording apparatus and reproducing apparatus for carrying out a fine recording by the utilization of the tunnel current, the present invention is designed in consideration of the disadvantages of the conventional examples mentioned above, and an object thereof is to provide a recording apparatus and reproducing apparatus capable of performing the recording and reproducing by the entire probes at accurate positions even when the medium is deformed due to the thermal expansion, for example in the course of recording or reproducing by a plurality of probes.

DESCRIPTION OF THE PREFERRED EMBODIMENTS

The recording medium used for an embodiment of a recording apparatus and reproducing apparatus set forth below comprises a metal oxide semiconductor organic thin film having a recording medium layer formed on a conductive substrate electrode, the aforesaid recording medium layer being capable of convexing the shape of its recording medium surface (refer to Staufer, Appl. Phys. Letters. Vol. 51(4), 27, Jul. 1987, p.244) or concaving it (refer to Heinzelmann, Appl. Phys. Letters, Vol. 53, 24, Dec., 1988, P.2447) by the tunnel current generated by a tunnel current generating probe, or comprises an organic thin film layer, etc. capable of changing its electrical characteristic conductivity by the aforesaid tunnel current. For the aforesaid organic film capable of changing its electrical characteristic, a Langmuir-Blodgett's film is preferable (refer to EP0272935 A2). More preferably, the aforesaid Langmuir-Blodgett's film should have in its layer face a structure capable of presenting an amorphous state or a second-dimensional crystalline state.

Also, the probe for generating the tunnel current used for a recording apparatus and reproducing apparatus according to the present invention is of such a structure that a cantilever provided with a displacement means is formed by a micromechanic technique on a substrate having a semiconductor layer, and at the leading end of the cantilever a probe is mounted. As the displacement means mentioned above, such a means as a piezoelectric effect, electrostatic power, etc. is employed, or preferably, means by use of a bimorph is employed. Further, since the probe is formed on the substrate having the semiconductor layer, it is necessary to provide a recording and reproducing chip having a semiconductor integrated circuit arranged in the vicinity of the probe, which comprises a current amplifying circuit for amplifying the current signals running from the probe for generating the tunnel current, a circuit for converting current voltage, a driving circuit for driving the aforesaid displacement means, and others.

Hereinafter, in conjunction with the accompanying drawings, the embodiments of the present invention will be described.

Figure 1:
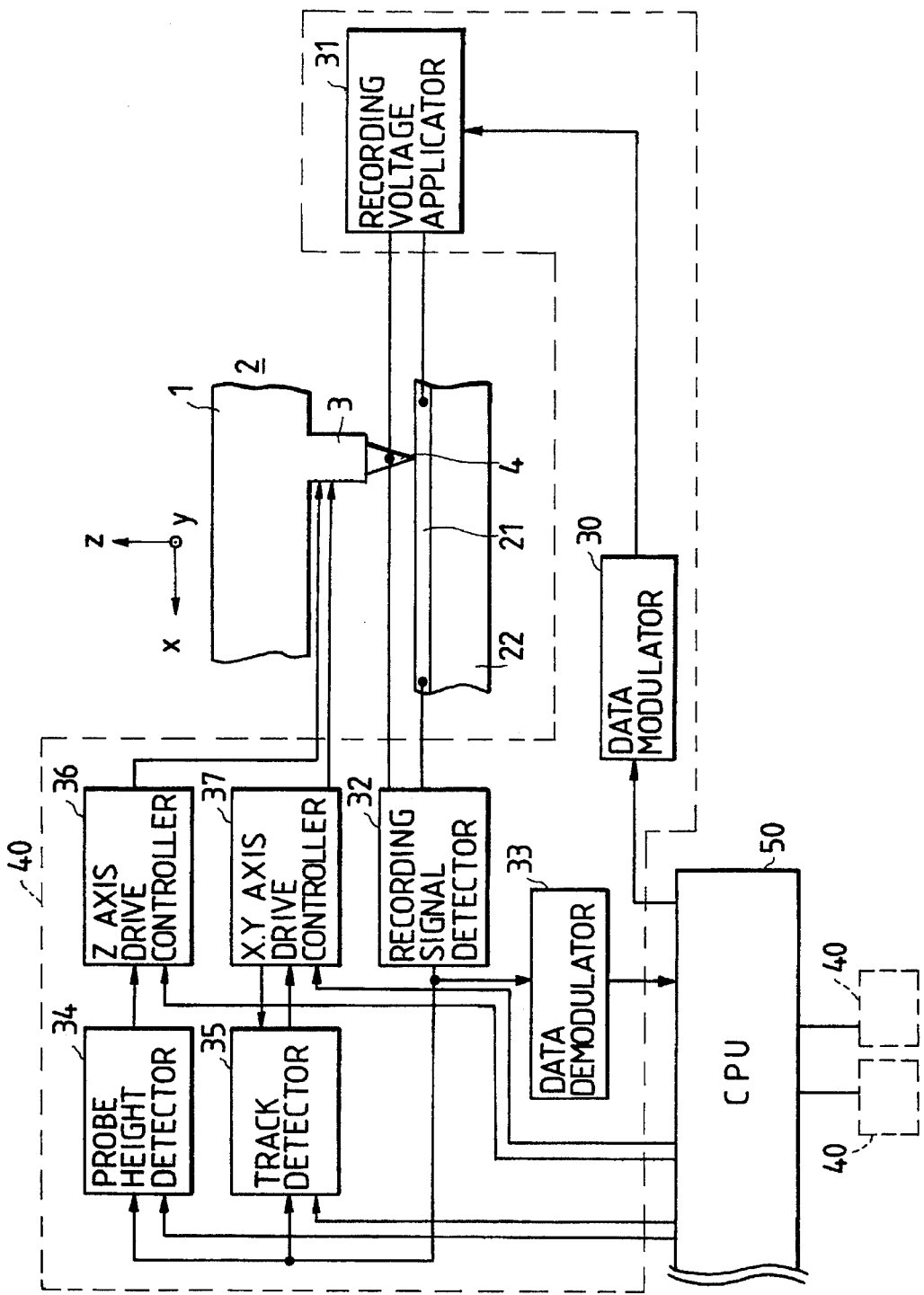
FIG. 1 is a schematic diagram showing the structure of a first embodiment of a recording and reproducing apparatus according to the present invention.
Figure 2:
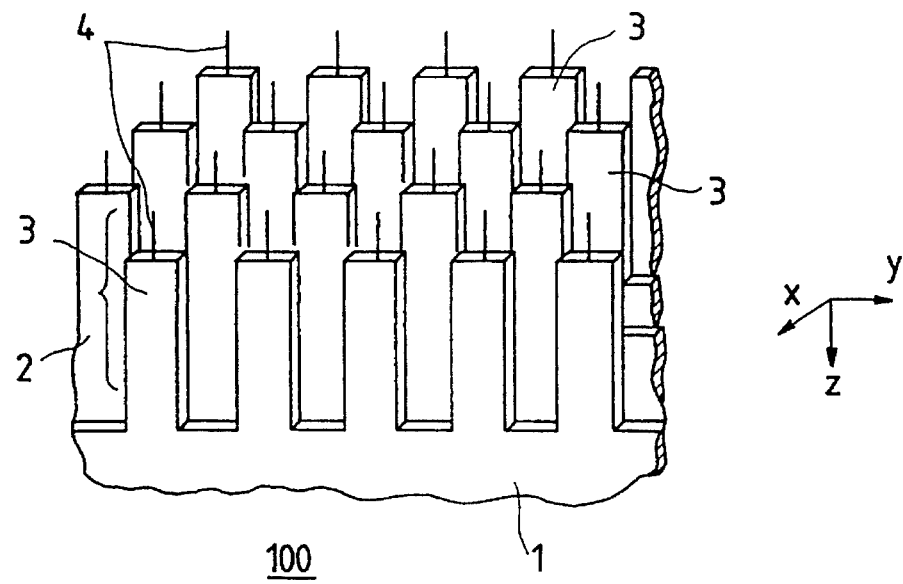
FIG. 2 is a perspective view schematically showing the recording and reproducing head of the aforesaid apparatus.

FIG. 1 is a view schematically showing the structure of a first embodiment of the recording and reproducing apparatus according to the present invention, and FIG. 2 is a view schematically showing the recording and reproducing head 100 employed for the apparatus thereof. On a recording and reproducing chip 1, a plurality of three-dimensional driving mechanisms 2 are configured in such a manner that each of them can independently displace itself in the three axes (in FIG. 1, only one of them is represented). At the leading end of each three-dimensional driving mechanism 2, a probe 4 for generating the tunnel current is mounted. The recording and reproducing head is constructed by a plurality of chips arranged in parallel, so that the plural probes of the plural chips face one recording medium at a time (in FIG. 1, only one of them is illustrated).

Figure 3:
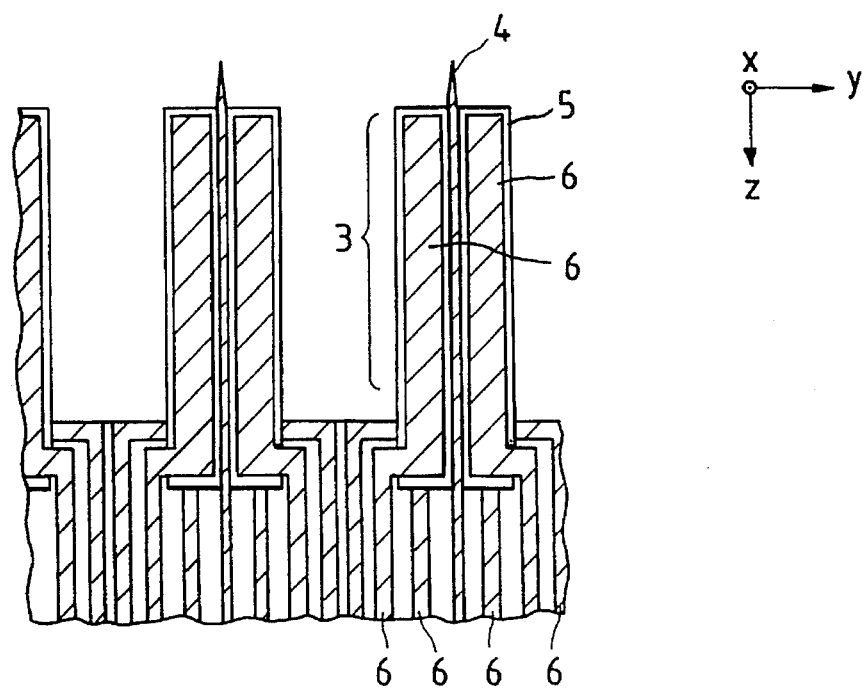
FIGS. 3 and 4 are a plan view and a cross-sectional view respectively showing a three-dimensional driving mechanism of the aforesaid apparatus.
Figure 4:
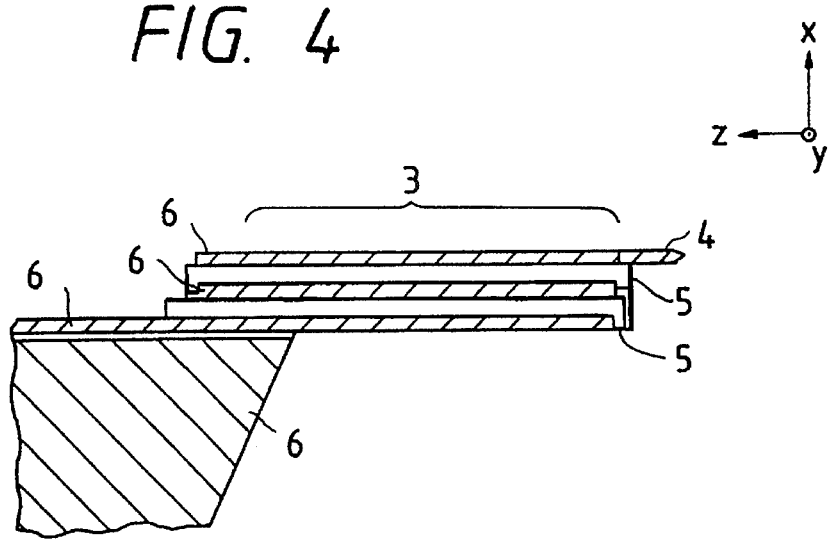

In FIG. 3 and FIG. 4, a piezoelectric bimorph three-dimensional driving mechanism is illustrated in detail as an example. FIG. 3 is its plan view while FIG. 4 is its side view. The three-dimensional driving mechanism 2 is formed by anisotropic etching from the reverse side of the Si substrate (100). The three-dimensional driving mechanism 2 comprises a piezoelectric thin film 5 as means for displacing the probe, and a cantilever 3 having the electrode 6, which drives the thin film. The piezoelectric thin film 5 is formed in two layers in the layer structure which sandwiches the electrode 6 as shown in the side view in FIG. 4, and a set such as this is arranged in two in series in the width direction (y direction) of the cantilever 3 as shown in FIG. 3. The cantilever 3 is displaced in the x direction by the balance of the expansion and contraction of the two piezoelectric thin films 5 overlapped in the layer structure, and the cantilever 3 is displaced in the y direction by the balance of the expansion and contraction of the two piezoelectric thin films 5 in the width direction. Also, the cantilever is displaced in the z direction by the entire expansion and contraction of the four piezoelectric thin films. Thus, the three-dimensional driving mechanism 2 drives the probe 4 in the three dimensional directions, x, y, and z. A z axis driving controller 36 and an x, y axes driving controller 37, which will be described later, control the driving of the cantilever 3 in the z direction and the x, y directions respectively by varying the value of voltage applied to each of the piezoelectric thin films 5 through the electrode 6 and the balance of the respective voltage values.

Now, referring back to FIG. 1, reference numeral 21 designates a recording medium for recording information and reference numeral 22 designates a recording medium holder. As a recording medium, there are used not only a medium such that Cr is deposited on quartz of 50 Å, for example, by a vacuum evaporation method and, further thereon, Au is deposited for 300 Å by the same method as a base electrode, on which SOAZ (squarilium-bis-6-octyl-azulene) is stacked by an LB method in four layers or the like, but also as in various recording media such as disclosed in the EP0272935 A2 Publication.

Here, a data modulator 30 modulates recording data into signals adequate for recording, and a recording voltage applicator 31 records the data on a recording medium by applying a voltage between the recording medium 21 and the probe 4 in accordance with the signals modulated by the data modulator. When, for example, a writing voltage of a rectangle pulse voltage of 3 volts high and 50 ns wide is applied by the recording voltage applicator 31 while the probe 4 is allowed to approach the recording medium 21 with a predetermined space, writing is executed because the recording medium is caused to vary its electrical conductivity to generate a portion which presents a different electrical resistance. Then, many pieces of information are recorded two-dimensionally on the recording medium 21 by applying the writing voltage in accordance with the information to be written while maintaining the probe 4 constantly in the z direction and at the same time, causing it to perform its relative scanning in the x and y directions. Here, reference numeral 32 designates a recording signal detector for detecting the current value of the tunnel current running between the probe 4 and the recording medium 21 when the voltage is applied therebetween, and reference numeral 33 designates a data demodulator for demodulating the tunnel current signals detected by the recording signal detector 32. In reproducing, a direct current voltage of 200 mv, for example, which is lower than the recording voltage, is applied between the probe 4 and the recording medium 21 while maintaining the probe 4 and the recording medium 21 with a predetermined space. In this condition, while the probe 4 is scanning along the recording bit array on the recording medium 21, the tunnel current signals, which should be detected by the use of the recording signal detector 32, respond to the recording data signals. Therefore, by the use of a data demodulator 33, it is possible to obtain the reproducing data signal by demodulating the detected tunnel current signal which is output after a current voltage conversion which is required.

Here, reference numeral 34 designates a detector for detecting the height of a probe. This detector 34 receives the detected signal from the recording signal detector 32 and processes the remaining signal after the high-frequency oscillating components due to the presence of an information bit have been cut, and issues an instruction signal to a z axis driving controller 36 in order to control the vertical movement of the probe 4 so that the value of this remaining signal becomes constant. Hence, a substantially constant space can be maintained between the probe 4 and the medium 21.

Reference numeral 35 designates a track detector. The track detector 35 detects the deviation of the probe 4 from the path, along which the data should be recorded, or from the bit array of the recorded data (hereinafter, they are referred to as a track) when the probe 4 performs the relative scanning on the recording medium 21. One example of this detection is given below.

Figure 5:
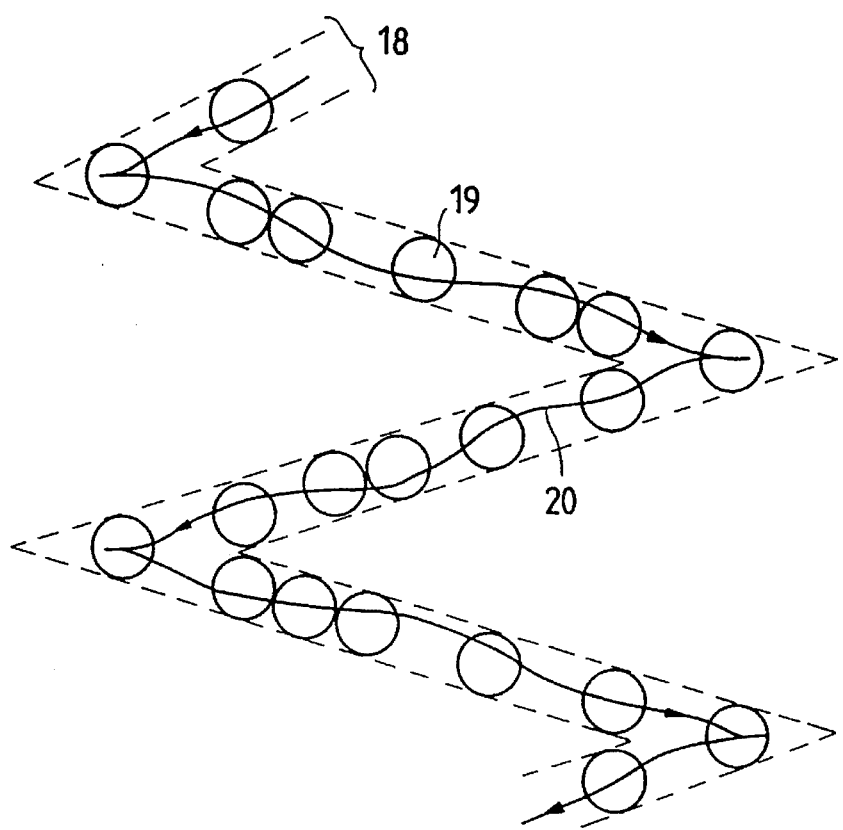
FIG. 5 is a view illustrating the probe scanning path in the aforesaid apparatus.
Figure 6A:
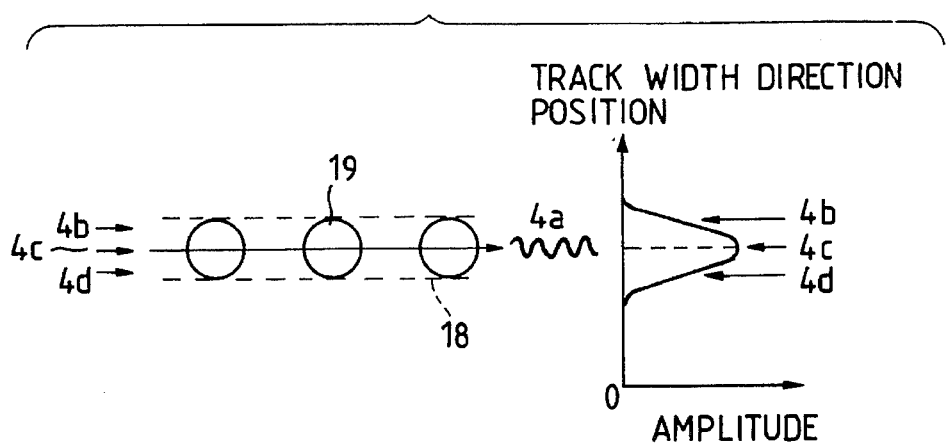
FIGS. 6A and 6B are views illustrating the principle of the tracking in the aforesaid apparatus.
Figure 6B:
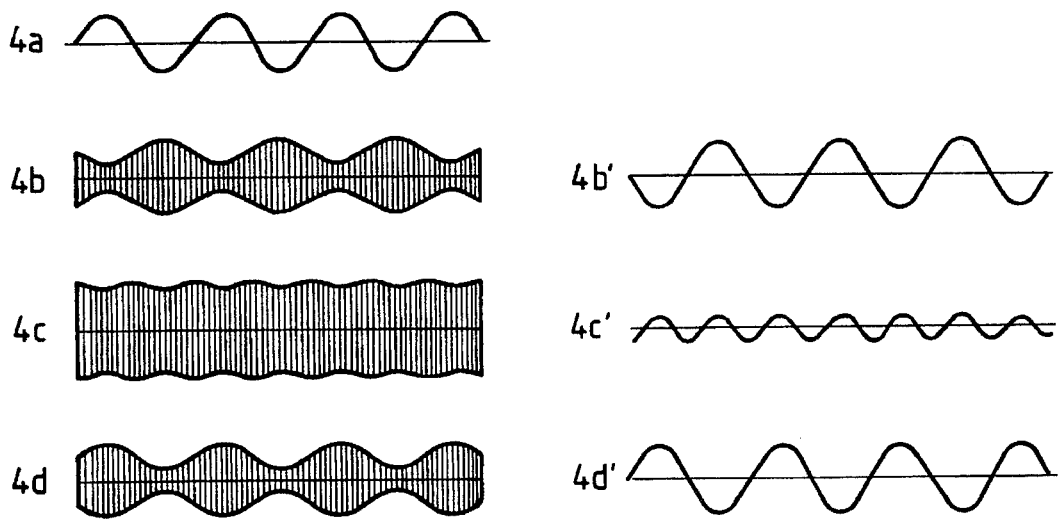

The x, y axes driving controller 37 drives the probe 4 to scan roughly along the contour of the track in accordance with an instruction from a CPU 50 which will be described later. At this juncture, the probe 4 is caused to oscillate in a width less than the bit width as well as at a frequency lower than the bit generating frequency in the bit array direction and the direction perpendicular thereto within the track. The movement of the probe 4 at that time will be shown in FIG. 5. In FIG. 5, reference numerals 18, 19, and 20 designate a track, an information bit, and the scanning path of the probe 4, respectively. Here, there is shown in FIG. 6A, the amplitude of the tunnel current signal generated by the probe 4 when passing through the bits each at the track width direction position of the probe. Now, since the amplitude of the generated signal varies in accordance with the track width direction position of the probe 4 in this fashion, a modulated component in response to the frequency of the width direction oscillation is added to the tunnel current signal detected by the probe 4 which performs the track scanning while oscillating in the track width direction. Here, there is shown in FIG. 6B, each of the detected signals when the center of this width direction oscillation is respectively at the positions in the track width direction, 4b, 4c, and 4d. In this respect, reference numeral 4a designates an oscillating waveform of the width direction oscillation of the probe 4 when these signals are generated, i.e., the waveform of the control signal in the track width direction provided for the three-dimensional driving mechanism. The signals shown in FIG. 6B with reference marks 4b, 4c, and 4d are formed by the collections of signals generated at each time the probe 4 passes through each of the bits. However, since each of the signals is extremely fine and is in a great number, the signals are simply represented only by an envelope in FIG. 6B.

As shown in FIG. 6B, the amplitudes of the detected signal change its envelope representing the signals 4b, 4c, and 4d of FIG. 6B in accordance with the positions indicated by arrows with the corresponding reference marks in FIG. 6A. Therefore, if the envelope signals are drawn by the full-wave rectification, the signals become those of 4b', 4c', and 4d' shown in FIG. 6B. In other words, against the oscillating waveform 4a of the probe 4, its envelope signal is as small as the signal 4c' when the probe 4 is located just above the calibrations as indicated by arrow 4c. If the probe is deviated upwards as indicated by arrow 4b, the phase is shifted 180° to the oscillating waveform 4a, and the amplitude also becomes large. If the probe is deviated downwards as indicated by arrow 4d, the phase becomes equivalent to the oscillating waveform 4a and the amplitude also becomes large. Accordingly, it is possible to obtain a signal proportional to the deviation from the center of the track by performing the phase detection of the detected signal after the full-wave rectification with the oscillation control signal in the track width direction of the probe 4 as its reference signal. The processes set forth above are executed in the track detector 35, and by adding the signals thus obtained to the x, y axes driving controller 37 as feed back signals, it is possible to carry out a feed back control such as to keep the probe 4 on the track. In other words, the tracking thus becomes possible.

In the above processes, when a tracking in the case of reproducing is considered alone, it suffices if only the above-mentioned tracking is performed using the bits corresponding to the recorded information, or in the same way as the tracking at the time of recording given below.

In performing a tracking at the time of recording, a plurality of bits for tracking are recorded at a plurality of locations in the track, the positions of which are known beforehand, and the probe 4 is caused to oscillate in the track width direction only when the probe passes through such locations to detect the recording signals for the execution of the tracking and the detection of the aforesaid intervals. Then, when the probe 4 is transported to the recording area in the track, the instruction signals from the probe height detector 34 and the track detector 35 are suspended and at the same time, its oscillation in the track width direction is also suspended.

A recording and reproducing circuit 40 comprises the above-mentioned data modulator 30, recording voltage applicator 31, recording signal detector 32, data modulator 33, probe height detector 34, track detector 35, z axis driving controller 36, and x, y axes driving controller 37.

Figure 7A:
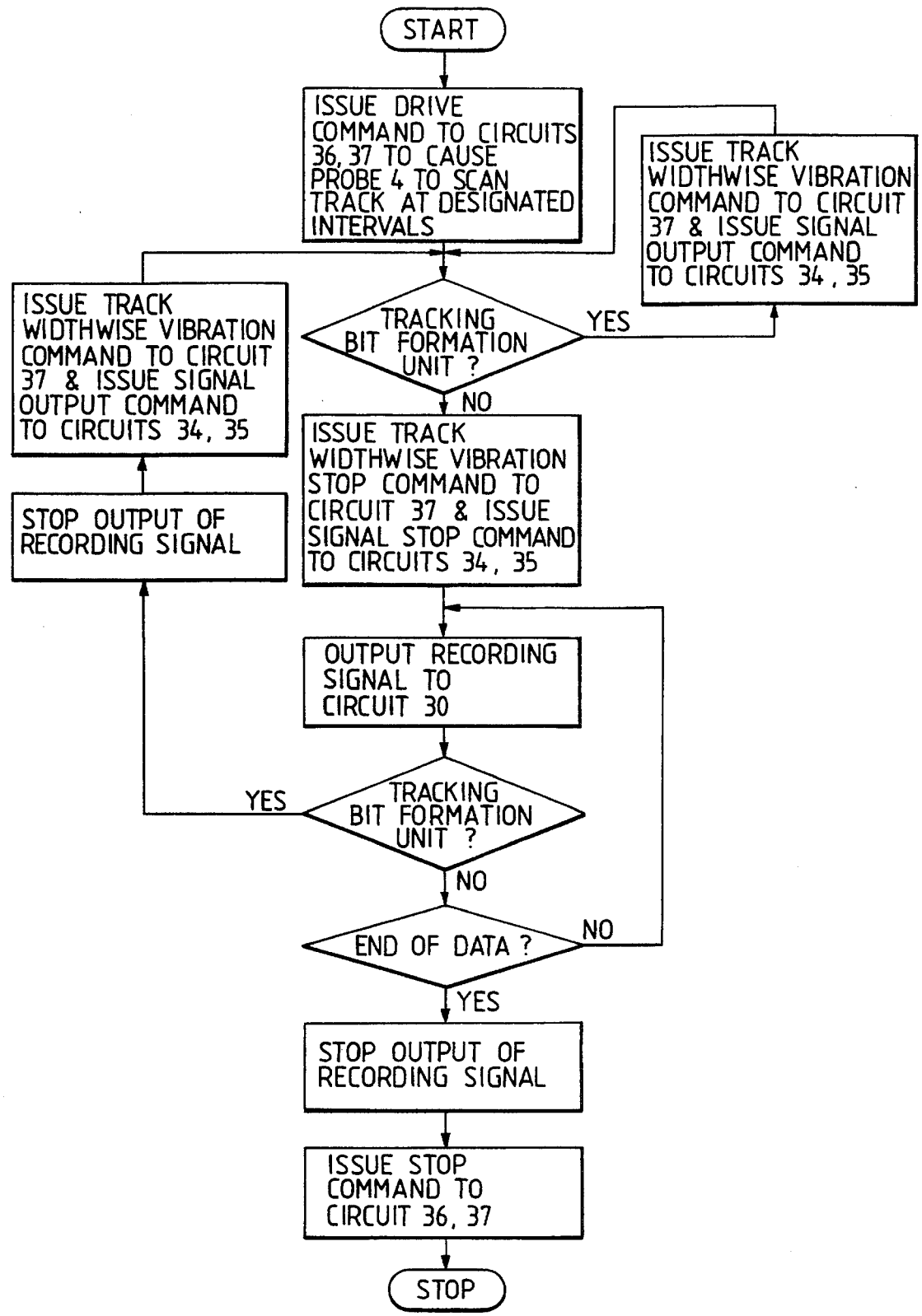
FIGS. 7A and 7B are flowcharts for the CPU control in the aforesaid apparatus.
Figure 7B:
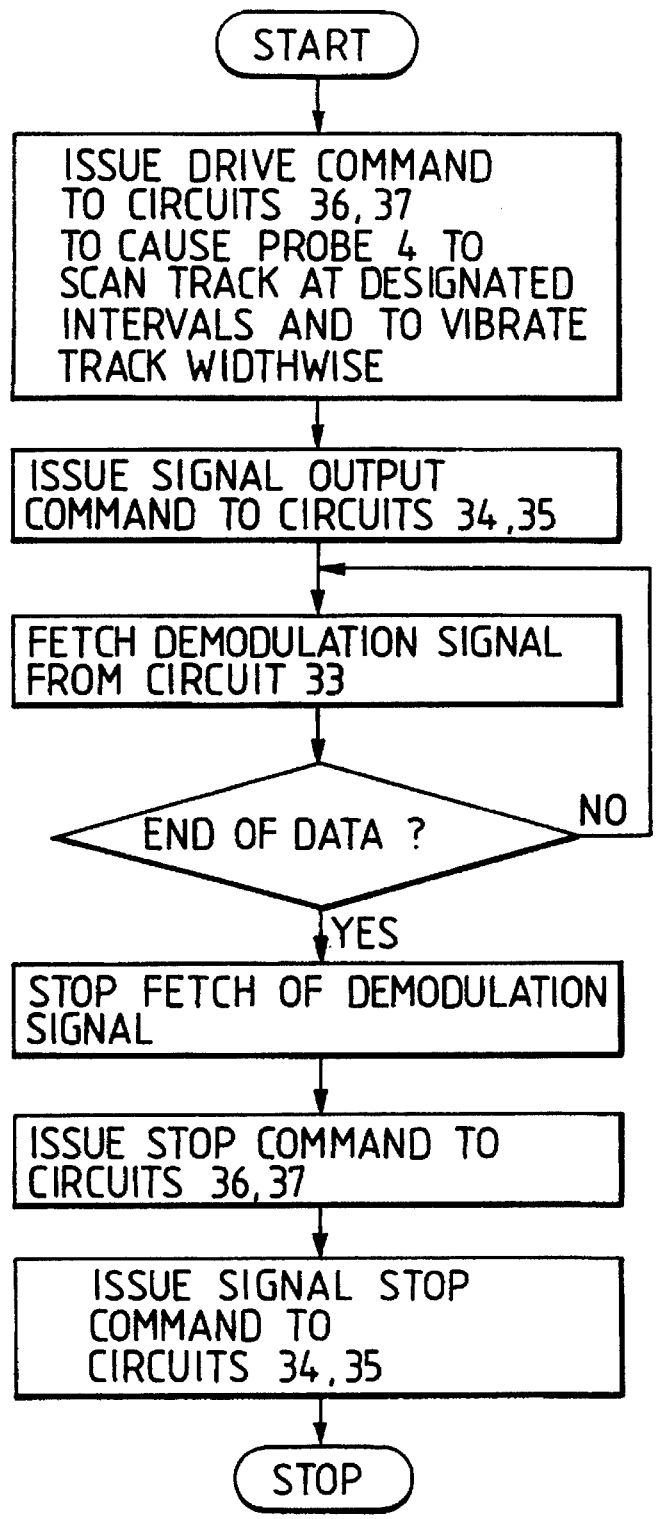

The recording and reproducing circuits 40 are provided respectively for a plurality of probes and its three-dimensional mechanisms facing the recording medium, and each of them performs independently such operations of the recording and reproducing of each probe, the displacement control for each probe (tracking, interval adjustment, etc.) or the like. Also, each of the aforesaid elements in the recording and reproducing circuit 40 is controlled by a CPU 50 separately for each of the circuits 40. FIGS. 7A and 7B are flowcharts showing the flow of control by the CPU 50 at the time of each recording and reproducing executed by the respective circuits 40. In this way, different information recordings and reproducings can be performed all at once (simultaneously) in each block.

Figure 8:
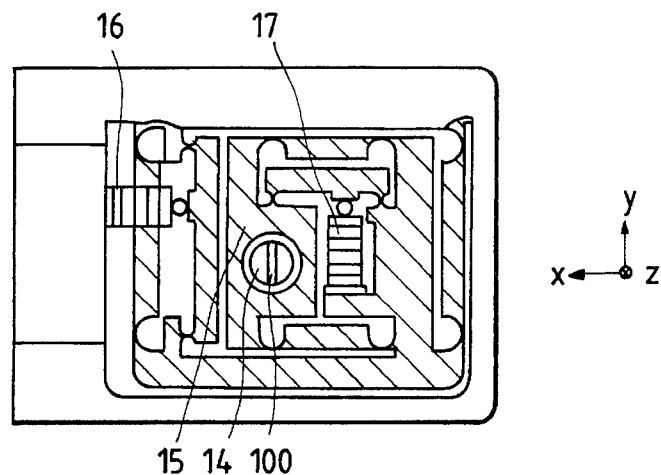
FIG. 8 is a view illustrating a control mechanism for the aforesaid apparatus.

As a method for adjusting the relative positional relationship by displacing either one of the recording medium or the recording and reproducing head 100 or both of them independently, there is a method using a control mechanism comprising a cylindrical piezo-actuator, a parallel spring, a differential micrometer, a voice coil, an inch worm, etc. FIG. 8 is a partial cross-sectional view illustrating an example of a control mechanism of that kind. In the present embodiment, the recording and reproducing head 100 is displaced as a whole by a control mechanism using the two kinds of displacement means having a high-displacement tubular piezoelectric element 14 and a parallel spring mechanism 15 for the wide area displacement in which layer-built piezoelectric bimorphs 16 and 17 are incorporated as shown in FIG. 8. At the upper end of the tubular piezoelectric element, the recording and reproducing head is arranged, and the entire body of this control mechanism is positioned to face the recording medium.

The layer-built piezoelectric bimorphs 16 and 17 are arranged to displace the recording and reproducing head 100 relative to the x and y axes respectively, and by driving them, the fixtures of the tubular piezoelectric elements in the parallel spring mechanism are transported in the x and y directions respectively. With this method, the displacement scanning of the area of 1 μm square or more can be performed by one probe 4.

Figure 9:
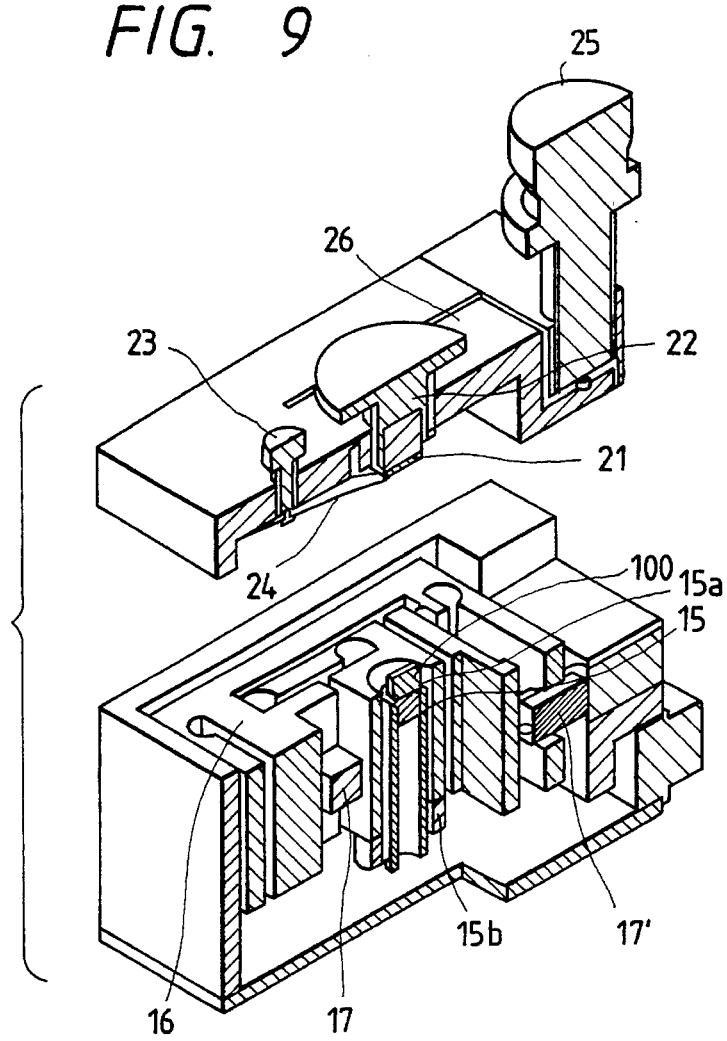
FIG. 9 is a perspective cross-sectional view showing the entire structure of the aforesaid apparatus.

FIG. 9 is a cross-sectional view showing the entire body of the recording and reproducing apparatus employed for the present invention. The recording and reproducing head 100 shown in FIG. 2 is held in the displacement control mechanism shown in FIG. 8 by a chip holder 15a, and further, the high-speed tubular piezoelectric element 15 is held by a fixing ring 15b. The recording medium 21 is fixed to a recording medium holder 22. When the tunnel current is generated, the bias voltage is supplied by allowing the electrode 24 to be in contact with the recording medium 21 by the use of an electrode screw 23.

In order to enable the recording and reproducing head 100 to approach the recording medium 21, a fine adjustment lever 26 is operated by rotating a fine adjustment screw 25. In FIG. 9, while the space between the upper and lower sections is widened in representation for an easier reading thereof, the recording medium section and the recording and reproducing head section are placed more closely than shown, in practice.

Figure 10:
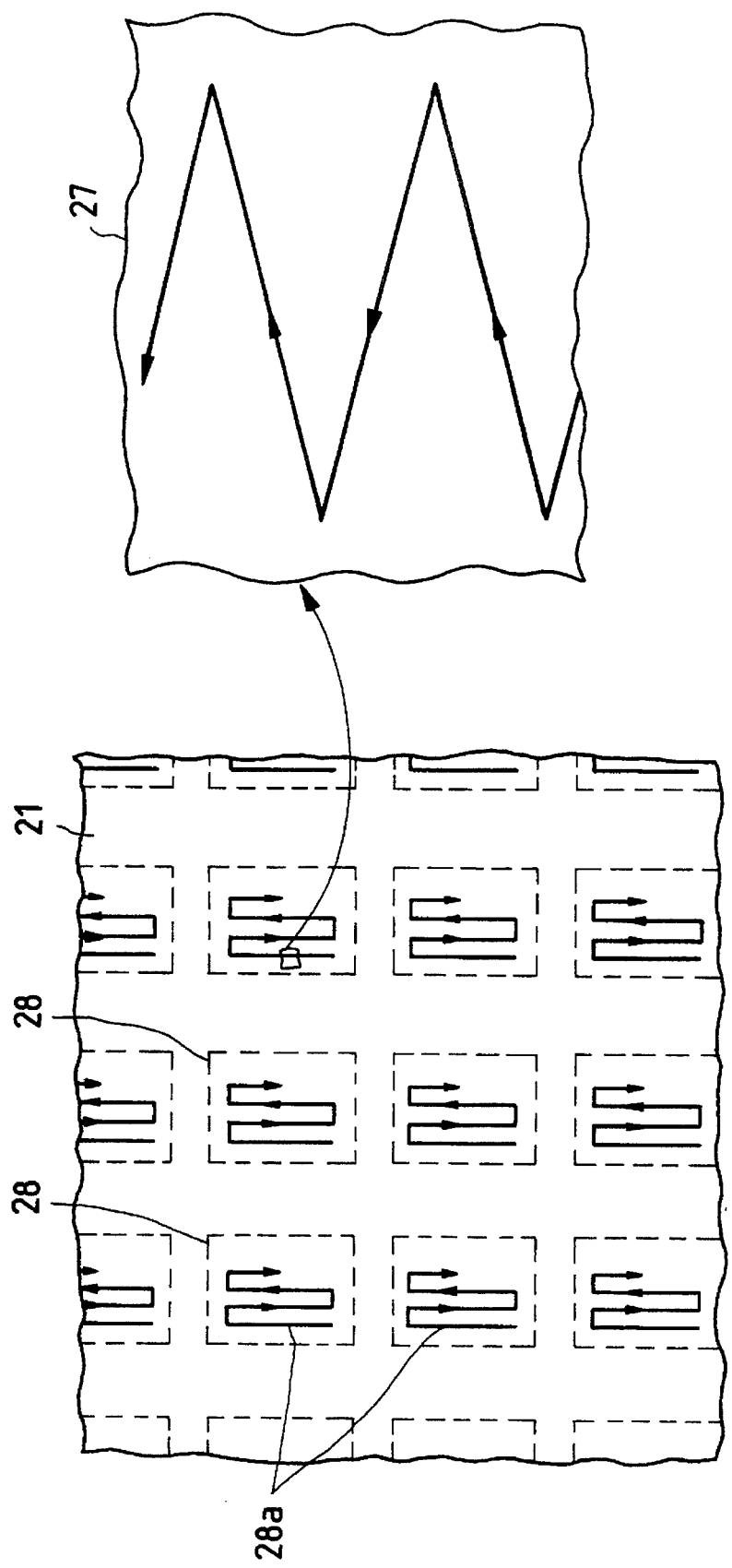
FIG. 10 is a view illustrating the scanning at the time of recording and reproducing in the aforesaid apparatus.

FIG. 10 is a view illustrating the scanning performed by the apparatus hereof at the time of recording and reproducing. Reference numeral 28 designates a region (block) of approximately 5 μm square, for example, where one probe performs its recording and reproducing by scanning on the recording medium 21. Reference numeral 28a designates a rough trace of the probe 4 on each of the blocks 28, and reference numeral 27 designates a partially enlarged view of the trace 28a.

With the layer-built piezoelectric bimorphs 16 and 17 and the tubular piezoelectric element 15, the entire body of the recording and reproducing head 100 is transported rectangularly so that the entire probes 4 scan roughly in the respective blocks 28 as shown by the traces 28a. At this juncture, each of the probes performs the fine track scanning by the driving of the three-dimensional driving mechanism 2 in a triangular wave having its amplitude of approximately 1 μm, for example, as shown in the enlarged representation 27. When the tracking is executed, a fine oscillation in the track width direction shown in FIG. 5 is further added thereto. Thus, it is possible to effectively utilize the recording area because the recording and reproducing are performed by the probes 4 while allowing them to move in a zigzag direction to scan on a specified area of the recording medium thoroughly and rapidly. Also, the tracking is performed independently by each probe to scan in each of the blocks, and even in a case when the expansion or contraction is generated between the respective blocks, it is possible to carry out the track scannings by all probes.

Figure 11:
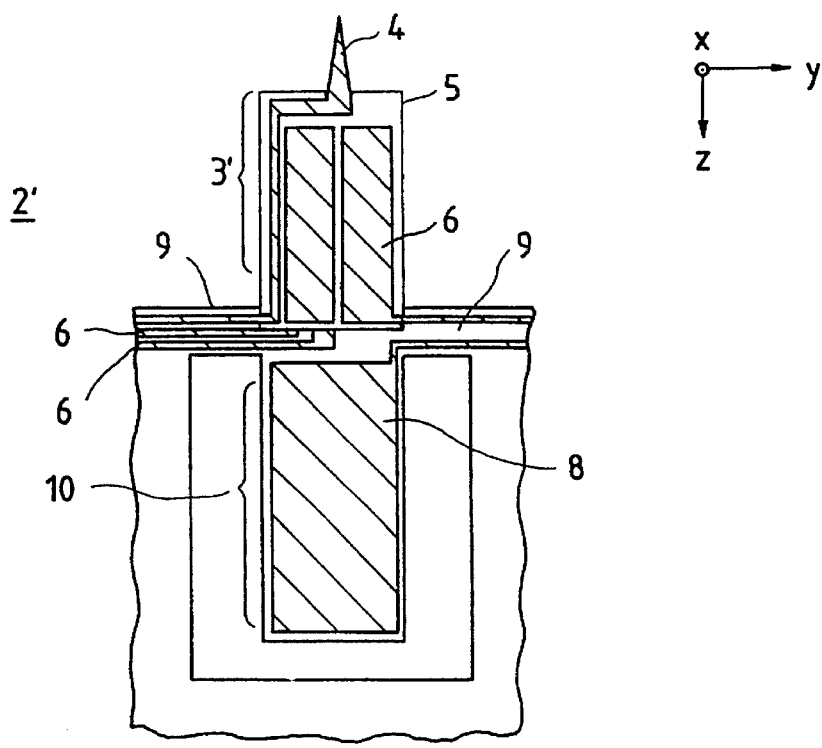
FIGS. 11 and 12 are a plan view and a cross-sectional view respectively showing the three-dimensional driving mechanism for a second embodiment of a recording and reproducing apparatus according to the present invention.
Figure 12:
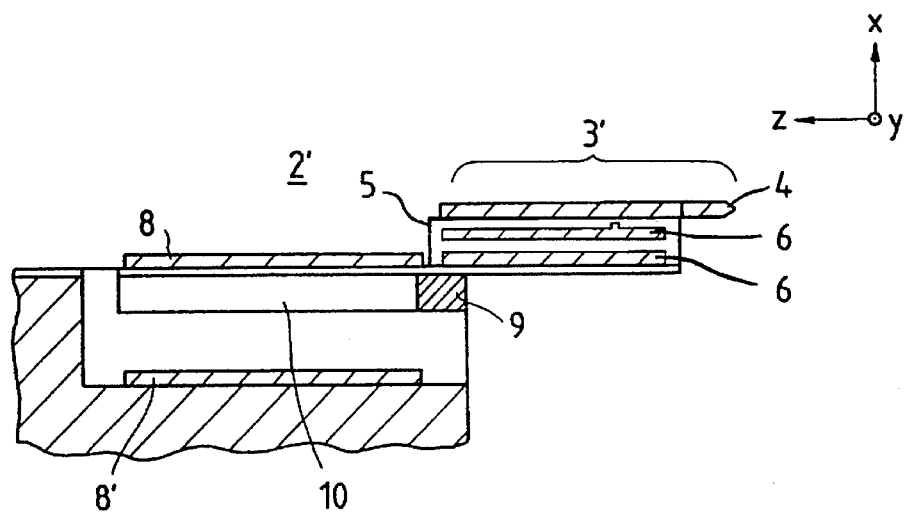

FIG. 11 and FIG. 12 are plan and cross-sectional views, respectively, showing the three-dimensional driving mechanism of a second embodiment of the recording and reproducing apparatus according to the present invention. The other structures and the operations thereof are the same as those described in the first embodiment. The same reference marks are provided for the same members appearing in the first embodiment. For the present embodiment, a three-dimensional driving mechanism 2' of the center beam cantilever type, which uses the piezoelectric effect and electrostatic power, is employed. A cantilever 3' is supported from both ends thereof in the width direction by center beam 9, and by utilizing the piezoelectric effect of the piezoelectric thin film 5, the probe 4 for generating the tunnel current at the upper end of the cantilever 3' is displaced in the longitudinal direction thereof. Then, it is possible to displace the cantilever 3' in the direction perpendicular to the aforesaid direction by applying a voltage to an electrode 8 above a second cantilever 10 formed in the direction of the substrate as well as to an electrode 8' beneath the second cantilever 10 to displace the second cantilever by the use of the electrostatic power. The center beam 9 spans from either side of a base plate to support both ends of cantilevers 3' and 10 as shown in FIGS. 11 and 12.

Figure 13:
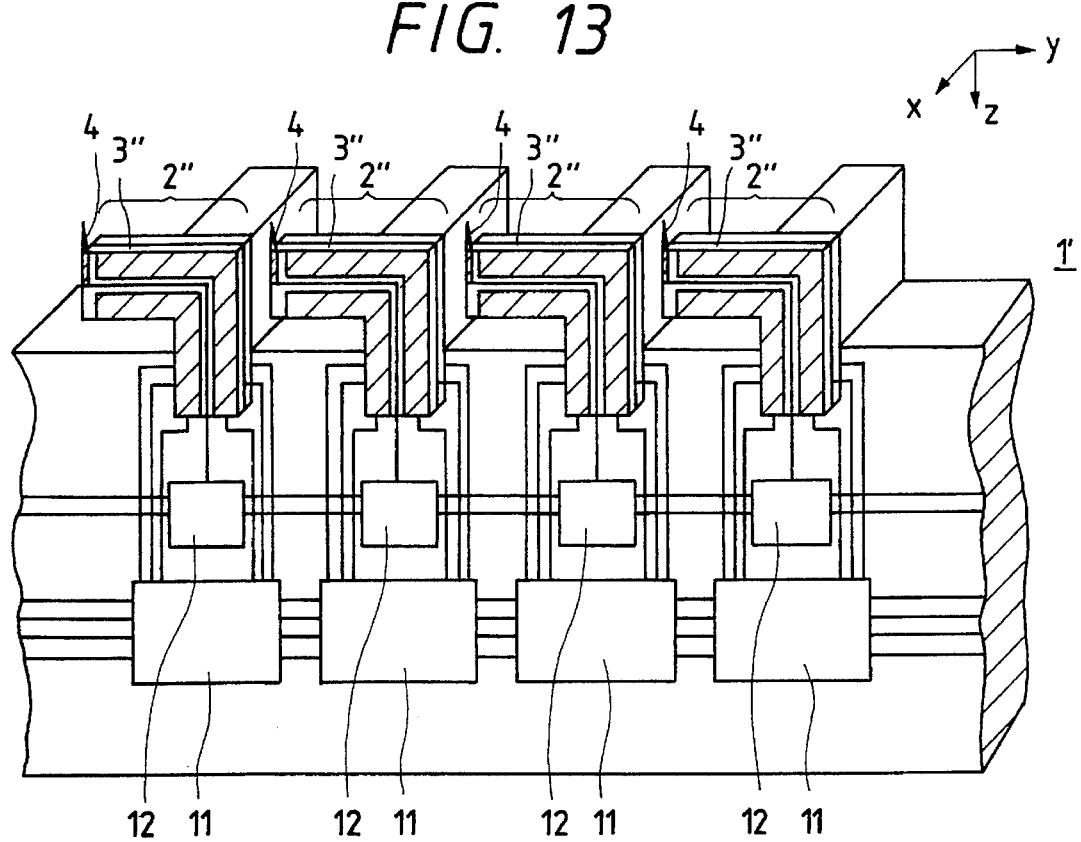
FIG. 13 is a view illustrating a recording and reproducing chip unit of a third embodiment of a recording and reproducing apparatus according to the present invention.

FIG. 13 is a view showing the recording and reproducing chip 1' of a third embodiment of the recording and reproducing apparatus according to the present invention. A three-dimensional driving mechanism 2" is arranged in such a structure that the three-dimensional driving mechanism 2, which has its longitudinal direction in the z direction of the first embodiment, is placed to locate its longitudinal direction in the y direction parallel to the medium surface, the width direction of the flat plate shape in the x direction, and its thickness direction in the x direction, whereas the probe 4 alone is located in the z direction (where the width > the thickness). Here, reference numeral 11 designates a driver for driving provided with a function equivalent to the z axis driving controller 36 and x, y axes driving controller 37 of the first embodiment. Reference numeral 12 designates a detector equivalent to the recording signal detector 32 of the first embodiment, and here, it has both a current amplifier for amplifying the tunnel current signal and a current voltage converter. The other structure and operations are the same as those of the first embodiment, and the driver for driving 11 and the recording signal detector are wired with the other members as in the first embodiment. In the present embodiment, a part of the recording and reproducing circuit 40 of the first embodiment, i.e., the driver for driving 11 and the recording signal detector 12 here, is formed on the recording and reproducing chip. In the present embodiment, the aforesaid recording and reproducing circuit is provided respectively for each one set of a plurality of probes and the three-dimensional driving mechanism. Therefore, it is possible to perform the tracking, etc. independently for the respective probes 4.

Figure 14:
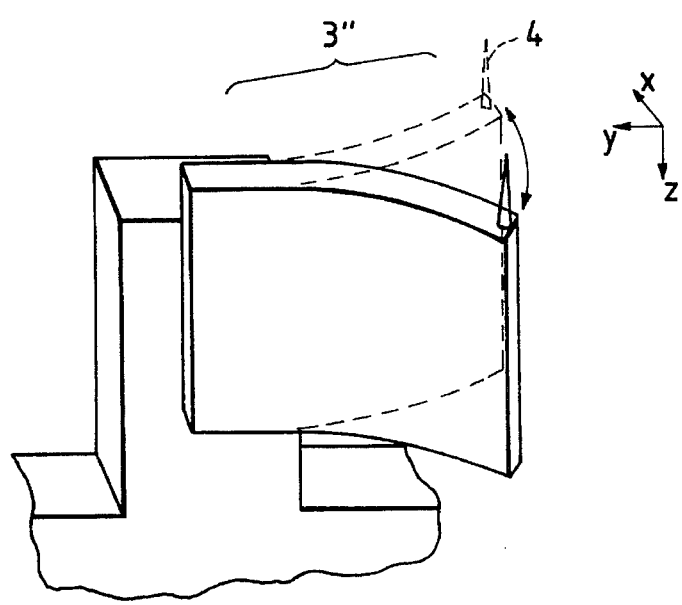
FIG. 14 is a view illustrating the displacement of a cantilever of the aforesaid apparatus.

A cantilever 3" shown in FIG. 13 is driven by the piezoelectric bimorph to displace itself greatly in the direction indicated by an arrow shown in FIG. 14. Accordingly, a large area can be obtained along the recording medium surface for the probe to scan. Also, there is no need for any special space in the z direction or for any space between the probe and the medium, which cannot be utilized objectively.

Given a length of 400 μm and a width of 100 μm for the cantilever 3" shown in FIG. 14, using a layer-built of aluminum nitride films of 1 μm as bimorph with an electrode sandwiched therebetween, a displacement of 10 μm is obtainable by applying a voltage of 30 V and 1 KHz. Also, the electrode formation for the bimorph being such as shown in FIG. 3, it is possible to provide the displacement of 0.2 μm in the longitudinal direction (z direction) of the probe 4 shown in FIG. 14, and the displacement in the longitudinal direction of the cantilever 3" as well at the same time. In this way, the space between the cantilever and the recording medium surface is regulated for controlling while being displaced in parallel with the recording medium surface.

As the above describes, the cantilever 3" is formed at the end face of a semiconductor chip substrate. Thus the recording and reproducing chip 1' of the present invention can be regarded as one cantilever. It is therefore possible to avoid the warping of the substrate surface generated in assembling.

Also, the embodiments set forth above are all for the recording and reproducing apparatus. The present invention, however, is applicable to an apparatus either for recording or for reproducing alone as a matter of course.

According to the present invention as described above, a plurality of recording and/or reproducing probes are allowed to perform the trackings independently, so that it is possible to carry out constant recording or reproducing at all times with the entire probes even if there occurs a thermal expansion, any change with the time elapsed or the like of the medium, for example.

What is claimed is:

1. An apparatus for effecting at least one of recording of information on and reproducing of information from a recording medium, said apparatus comprising:
   a plurality of probes, arranged at positions respectively facing a plurality of information blocks of the recording medium, for effecting at least one of recording of information on and reproducing of information from the information blocks of the recording medium;
   displacement means for independently displacing each of said plurality of probes at least in a direction parallel to a recording surface of the medium;
   detecting means for detecting deviation of each of said plurality of probes in an in-surface direction of the recording medium relative to a predetermined path on the recording medium;
   tracking means for causing each of said plurality of probes to independently perform tracking relative to the predetermined path on the basis of the detected deviation, in order to compensate for the deviation; and
   recording and reproducing means comprising voltage application means for applying voltage between said probes and the recording medium for generating a tunnel current between said probes and the recording medium to effect at least one of recording of information on and reproducing of information from the recording medium.

2. An apparatus of claim 1, wherein the recording medium includes a recording medium layer having an organic thin film.

3. An apparatus of claim 1, wherein said voltage application means comprises means for applying a recording voltage as a recording pulse in accordance with the information to be recorded.

4. An apparatus of claim 3, wherein said voltage application means comprises means for independently applying voltage to each of said plurality of probes for separately recording the information in each of the blocks.

5. An apparatus of claim 1, further comprising current detecting means for detecting current flowing between said plurality of probes and the recording medium when voltage is applied by said voltage application means, and wherein information is reproduced based on the detected current.

6. An apparatus of claim 5, wherein the current detected by said current detecting means is a tunnel current.

7. An apparatus of claim 5, wherein said current detecting means comprises means for independently detecting current by each of said plurality of probes, thereby reproducing the information separately from each of the blocks.

8. An apparatus of claim 1, wherein said displacement means comprises means for displacing each of said plurality of probes in three-dimensional directions.

9. An apparatus of claim 8, wherein said displacement means comprises a cantilever for supporting a respective probe at its upper end and means for displacing said probe by deforming said cantilever in the three-dimensional directions.

10. An apparatus of claim 9, wherein said cantilever has its longitudinal direction in a direction parallel to the medium surface and its width direction in a direction perpendicular to the medium surface.

11. An apparatus of claim 8, wherein said displacement means further comprises a piezoelectric element.

12. An apparatus of claim 8, wherein said displacement means comprises means for adjusting the space between said probes and the medium by displacing said probes in a direction towards the medium, and means for causing said probes to scan along a specified path in each of the blocks by displacing said probes in a direction parallel to the medium surface.

13. A probe unit according to claim 8, wherein said displacement means further comprises means for displacing said probe by utilizing a piezoelectric effect and electrostatic power.

14. An apparatus of claim 1, wherein the predetermined path includes a triangular wave path.

15. An apparatus of claim 1, wherein said tracking means performs the tracking with a fine oscillation of the probe along the predetermined path in a direction perpendicular to the direction of the predetermined path.

16. An apparatus of claim 1, wherein each of said probes and said displacement means are formed by a micromechanic technique.

17. An apparatus of claim 1, wherein the predetermined path is formed by reference marks provided in a plurality of locations on the recording medium.

18. An apparatus for effecting at least one of recording of information on and reproducing of information from a recording medium by using a probe, said apparatus comprising:
   a base plate;
   a cantilever supported at both ends thereof in a direction of its width to said base plate; and
   a probe provided on said cantilever.

19. An apparatus according to claim 18, further comprising:
   a fixed electrode provided on said base plate;
   an opposite electrode provided on said cantilever at a position opposed to said fixed electrode; and
   displacing means for displacing said cantilever by applying a voltage between said fixed electrode and said opposite electrode.

20. An apparatus for effecting at least one of recording of information on and reproducing of information from a recording medium, said apparatus comprising:
   a probe, arranged at a position facing the recording medium, for effecting at least one of recording of information on and reproducing of information from the recording medium;
   moving means for moving said probe in a direction of movement along a predetermined path having a pattern preformed on the recording medium such that the direction of movement periodically reverses direction;
   detecting means for detecting deviation of said probe in an in-surface direction of the recording medium relative to the predetermined path on the recording medium;

tracking means for causing said probe to perform tracking relative to the predetermined path on the basis of the detected deviation in order to compensate for the deviation; and recording and reproducing means comprising voltage application means for applying voltage between said probe and the recording medium for generating a tunnel current between said probe and the recording medium to effect at least one of recording of information on and reproducing of information from the recording medium along the specified path.

21. An apparatus of claim 20, wherein the recording medium includes a recording medium layer having an organic thin film.

22. An apparatus for effecting at least one of recording of information on and reproducing of information from a recording medium by using a probe electrode, said apparatus comprising:

a base plate;

a cantilever supported at both ends thereof in a direction of its width to said base plate;

a probe electrode provided on said cantilever; and means for applying a voltage between said probe electrode and the recording medium for generating a tunnel current between said probe and the recording medium to effect at least one of recording of information on and reproducing of information from the recording medium.

23. An apparatus according to claim 22, further comprising:

a fixed electrode provided on said base plate;

an opposite electrode provided on said cantilever at a position opposed to said fixed electrode; and displacing means for displacing said cantilever by applying a voltage between said fixed electrode and said opposite electrode.

24. An apparatus according to claim 22, further comprising:

a piezoelectric element provided in said cantilever; and deforming means for deforming said cantilever by applying current to said piezoelectric element.

* * * * *

UNITED STATES PATENT AND TRADEMARK OFFICE
CERTIFICATE OF CORRECTION

PATENT NO. : 5,490,132
DATED : February 6, 1996
INVENTOR(S) : Takayuki YAGI, et al.

It is certified that error appears in the above-indentified patent and that said Letters Patent is hereby corrected as shown below:

COLUMN 1:

Line 32, "$\mu m$" should read --$\mu m^2$--.

COLUMN 5:

Line 63, "4d'shown" should read --4d' shown--.

COLUMN 8:

Line 57, "as" should read --as a--.

COLUMN 10:

Line 20, "A probe unit" should read --An apparatus--.

Signed and Sealed this

Twenty-seventh Day of August, 1996

Attest:

BRUCE LEHMAN

*Attesting Officer*      *Commissioner of Patents and Trademarks*